Jan. 24, 1933.  L. D. SOUBIER  1,895,139
GLASS BLOWING MACHINE
Filed Aug. 28, 1930   5 Sheets-Sheet 1
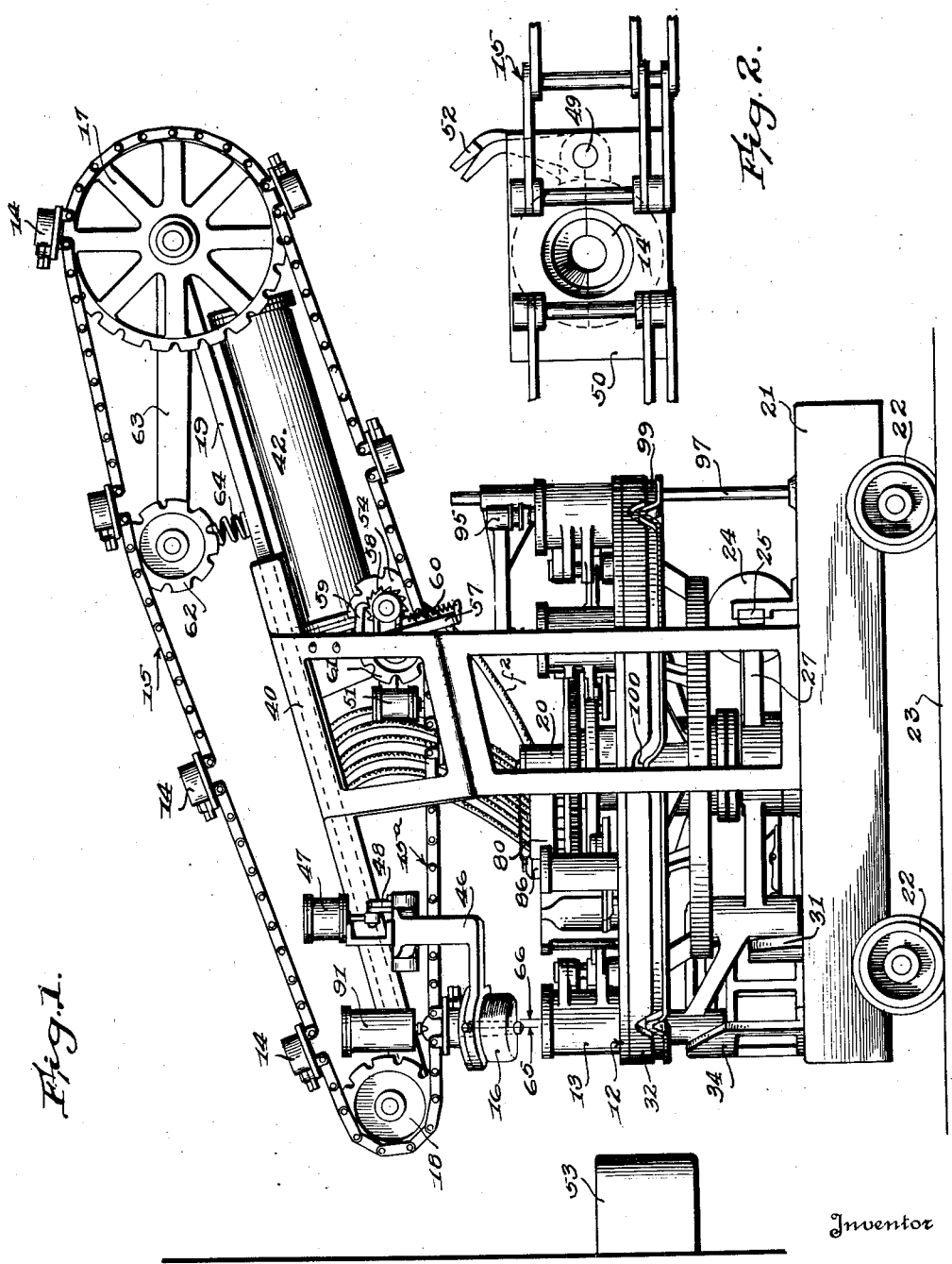
Inventor
Leonard D. Soubier
By J. F. Rule
Attorney

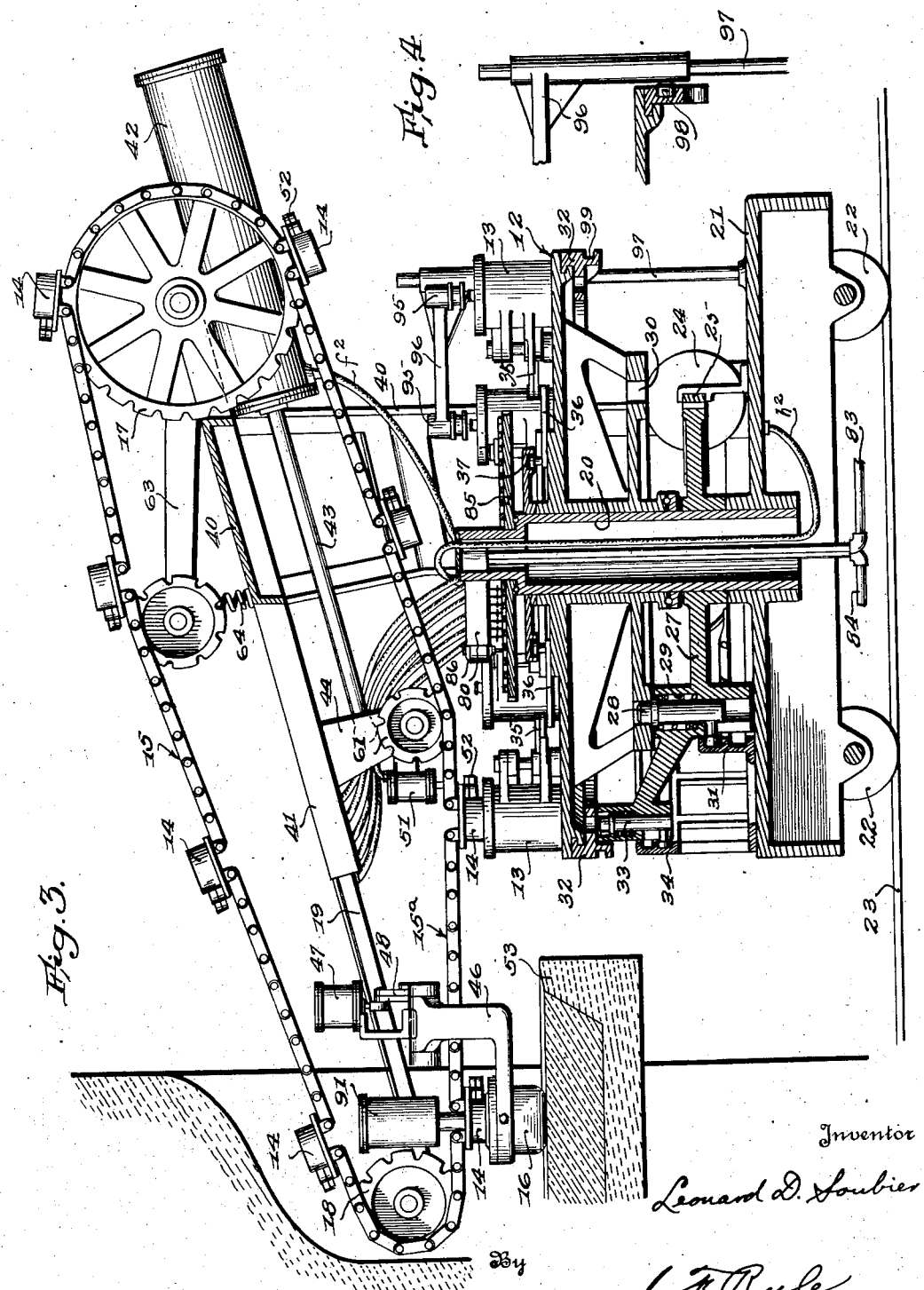

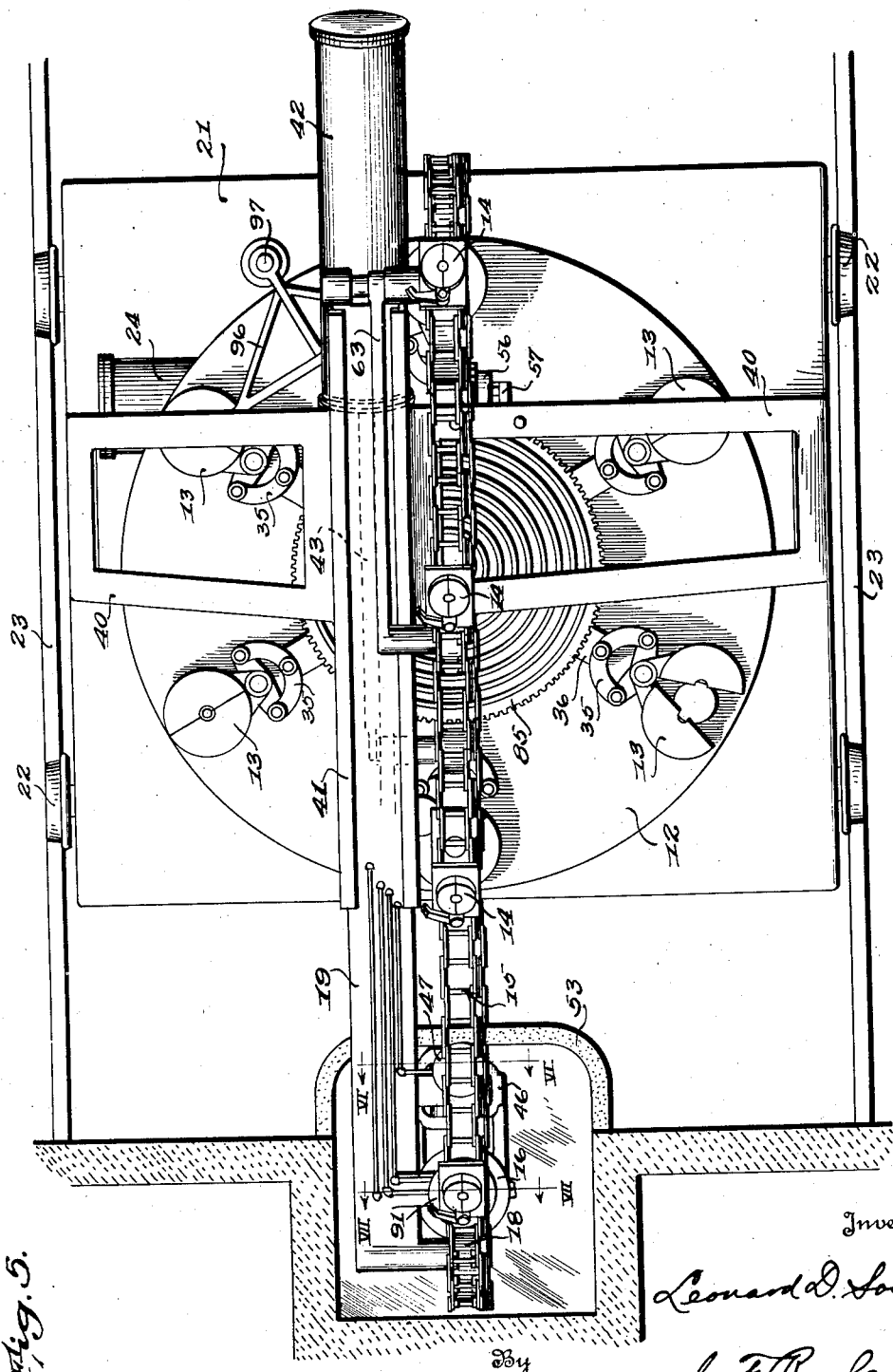

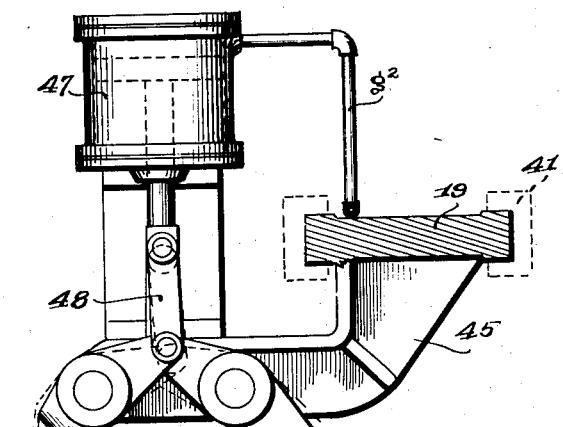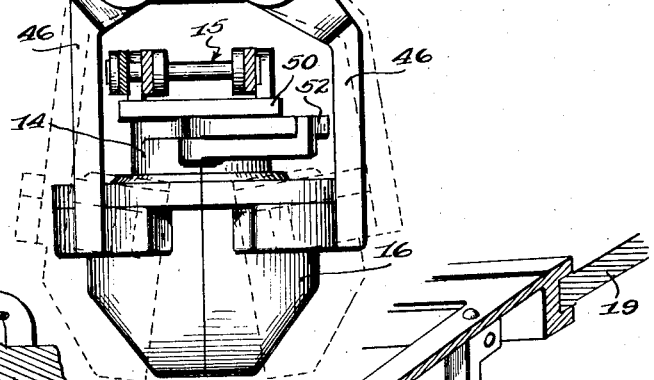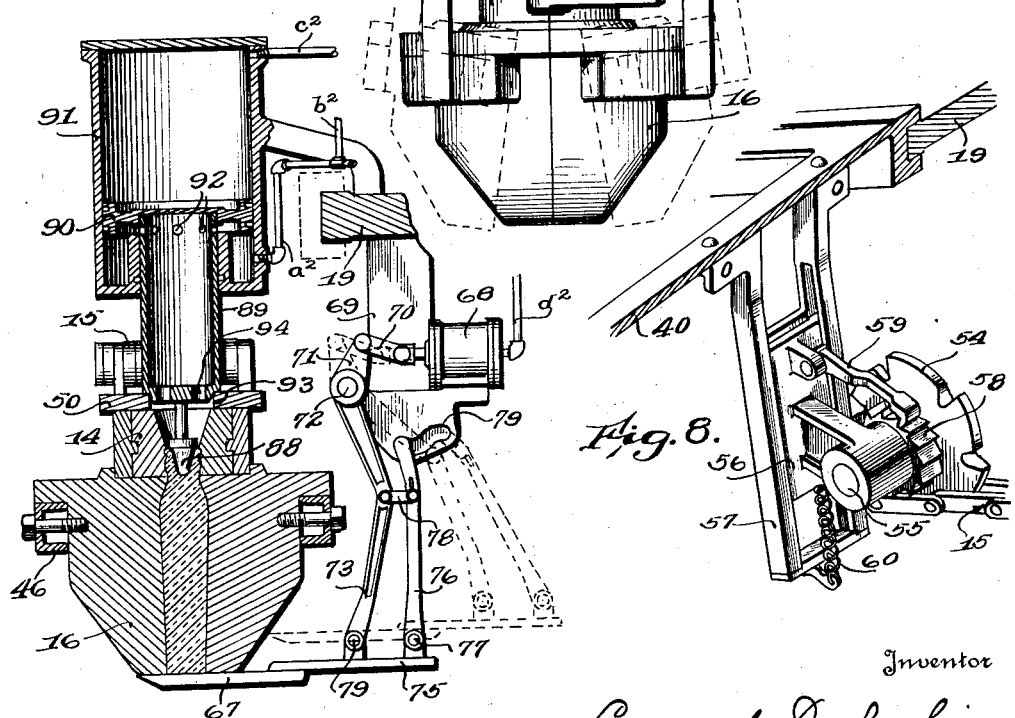

Jan. 24, 1933. L. D. SOUBIER 1,895,139
GLASS BLOWING MACHINE
Filed Aug. 28, 1930 5 Sheets-Sheet 5

Inventor
Leonard D. Soubier
By
J. F. Rule.
Attorney

Patented Jan. 24, 1933

1,895,139

UNITED STATES PATENT OFFICE

LEONARD D. SOUBIER, OF TOLEDO, OHIO, ASSIGNOR TO OWENS-ILLINOIS GLASS COMPANY, A CORPORATION OF OHIO

GLASS BLOWING MACHINE

Application filed August 28, 1930. Serial No. 478,352.

My invention relates to machines for forming bottles, jars or other glass articles, and particularly to a type of machine in which each charge of glass is given an initial formation in a combined blank and neck mold and the parison thus formed is then transferred to a finishing mold in which the article is blown to its finished form. In machines of this general type now in use, it is customary to provide a plurality of mold groups or units each comprising a body blank mold, a neck mold and a finishing mold. When a parison of glass is introduced into a finishing mold and blown therein, it must be retained in the mold for a considerable length of time to permit the necessary cooling so that it will retain its shape after the mold is opened. On the other hand, the parison must be retained for only a comparatively short time in the blank mold to prevent excessive cooling. As a result, the blank molds are idle much of the time, resulting in a corresponding inefficiency of operation.

An object of the present invention is to provide a simple and practical machine in which the above objection is overcome and the output of the machine for each mold materially increased. In the attainment of this object, I provide a machine in which a single gathering or blank mold cooperates with a series of neck molds in succession and also serves to supply parisons to a plurality of finishing molds.

In its preferred form, the invention comprises a machine including a mold carriage on which are mounted a plurality of finishing molds, a reciprocating ram on which the blank mold is mounted and reciprocated from a charge receiving position to a parison transfer position, and an endless carrier mounted on the ram and carrying a series of neck molds which are brought in succession into cooperative relation to the blank mold. The blank mold, therefore, cooperates with each of the neck molds in succession in the formation of the parisons, the latter being transferred from the blank mold to the several finishing molds in succession. Suitable means may be provided, if desired, for water cooling the blank mold. In the preferred form of the invention, the charges of glass are gathered by suction into the molds, although various features of the invention may be embodied in machines in which the glass is dropped by gravity into the molds or introduced by other than the suction method.

Other objects of the invention will appear hereinafter.

In the accompanying drawings:

Fig. 1 is an elevation view of a machine constructed in accordance with my invention.

Fig. 2 is a plan view of a neck mold and its carrier.

Fig. 3 is a sectional elevation of the machine, showing the parts in the position assumed while the blank mold is in charge gathering position.

Fig. 4 is a fragmentary detail view showing the operating connections between the blowing head frame and its operating cam.

Fig. 5 is a plan view of the machine with the parts in the Fig. 3 position.

Fig. 6 is a sectional elevation at the plane of the line VI—VI on Fig. 5, showing the blank mold and a neck mold, and the air motor and connections for operating the blank mold.

Fig. 7 is a section at the line VII—VII on Fig. 5, showing a neck mold, the blank mold and plunger, the air motor for operating the plunger, and the knife mechanism.

Fig. 8 is a detail showing the pawl and ratchet mechanism for locking the neck mold carrier.

Figure 9:
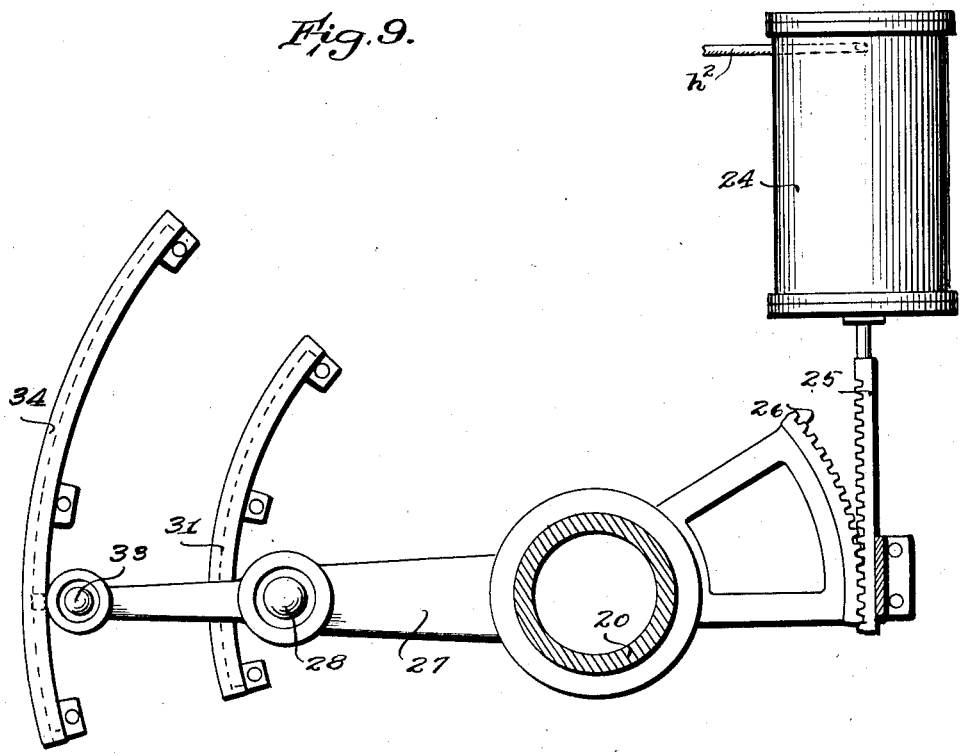
Fig. 9 is a plan view of the mechanism for imparting a step-by-step rotation to the finishing mold carriage.

The machine as herein shown comprises a mold carriage 12 on which an annular series of finishing molds 13 are mounted. A series of neck molds 14 are carried on an endless chain carrier 15 and brought in succession into register with a blank mold 16. The neck mold carrier is trained over sprockets 17 and 18 which are mounted on a reciprocating ram 19. The blank mold 16 is also carried on the ram 19 and reciprocated thereby from the charge gathering position (Fig. 3) to a position over a finishing mold (Fig. 1). The blank mold throughout this movement is interlocked with the neck mold so that the parison which has been introduced into the combined blank and neck mold is moved to a position over a finishing mold, the blank mold during this transfer movement operating to advance the neck mold carrier and bring a succeeding neck mold to the charging position.

The finishing mold carriage 12 is mounted for horizontal rotation about a hollow center column 20 which rises from a base or platform 21 on which the machine is mounted. The base 21 is carried on wheels 22 running on tracks 23, permitting the machine to be moved to and from the furnace. The mold carriage is rotated step-by-step by means of the indexing mechanism (Fig. 9) comprising an air motor 24. A rack 25 on the motor piston engages rack teeth 26 on an indexing frame 27 mounted to oscillate on the column 20. The indexing frame 27 carries a locking pin 28 which is projected by a spring 29 into openings 30 formed in the mold carriage. The locking pin 28 is withdrawn by means of a stationary cam 31 on which runs a cam roll carried by the locking pin. A cam ring 32 supported on the mold carriage, but rotatable independently thereof for a purpose which will appear hereinafter, is periodically connected to the indexing frame 27 by a locking pin 33. Said pin is projected to locking position by a spring and is retracted by a stationary cam 34 on which runs a cam roll carried by said pin.

The finishing molds 13, which may be of usual construction, comprise partible sections carried on mold arms connected through links 35 to slides 36, the latter mounted to reciprocate radially of the mold carriage under the control of a stationary cam 37.

The ram 19 and parts carried thereby are supported on a stationary framework 40 which rises from the base 21. The ram 19 which is downwardly and outwardly inclined with respect to the finishing mold carriage, reciprocates in the direction of its length in a stationary guideway 41 carried on or formed integral with the framework 40. An air operated piston motor 42 comprises a cylinder fixed to the frame 40 and a piston 43 connected at its outer end to an arm 44 depending from and forming part of the ram 19.

The blank mold 16 is connected to reciprocate with the ram by means of a bracket arm 45 (Fig. 6) on which the blank mold carrying arms 46 are pivotally mounted. The blank mold is opened and closed by an air motor 47, operatively connected through a link 48 to the mold arms.

Each neck mold 14 comprises a pair of hinged sections fulcrumed on a pivot pin 49 (Fig. 2) on a mold supporting plate 50 which forms a link in the endless chain carrier 15. The neck molds are opened by an air motor 51 (Fig. 3) mounted on the arm 44. The motor piston when projected downward enters between lugs 52 (Fig. 2) formed on the mold arms and spreads the mold sections.

When the ram 19 is projected, the blank mold 16 carried thereby is moved in a downwardly and outwardly inclined direction away from the center of the machine and brought to the charge gathering position (Fig. 3) in contact with the supply body of molten glass in a gathering tank 53. During the movement of the blank mold to the charge gathering position, the mold sections are held separated. When the blank mold reaches the charging position, the mold arms 46 straddle a neck mold 14 which has been brought to the charging position at the same time, as more fully hereinafter explained. The motor 47 now operates to close the blank mold, locking it to and in register with the neck mold. The combined blank and neck mold are herein referred to as the parison mold. A charge of glass is now drawn into the parison mold, after which the ram 19 is withdrawn to the Fig. 1 position for transferring the parison mold and parison therein to a position over the finishing mold. During this transfer, the blank and neck molds remain closed and interlocked so that there is no relative movement of said molds, nor of the neck mold carrier 15 relative to the ram.

When the parison is brought to the Fig. 1 position over a finishing mold, the motor 47 operates to open the blank mold, permitting it to be again advanced to the charging position while the neck mold with the parison of glass depending therefrom is lowered to the finishing mold and the next succeeding neck mold is brought to the charging position. These movements require that the lower lead 15ª of the chain carrier 15 shall be held against forward movement with the ram. This is effected by mechanism comprising a pawl and ratchet device (Figs. 1 and 8). Such mechanism includes a sprocket wheel 54 engaging the chain 15, said sprocket wheel secured to a stud shaft 55 mounted on a slide plate 56 movable up and down in guideways formed in an arm 57 fixed to the stationary frame 40. A ratchet wheel 58 secured to the shaft 55 is engaged by a pawl 59 on the slide plate. A spring 60 connected to the slide plate and the arm 57, holds the sprocket 54 in engagement with the chain while the chain and sprocket move up and down, it being noted that there is a limited up and down movement of the chain at this point. An idler sprocket 61 mounted on the arm 44 engages the chain carrier and maintains the lower lead 15ª in a substantially horizontal position at all times.

During the forward movement of the ram, the sprocket 54 is locked against rotation in a clockwise direction (Fig. 1) so that the chain carrier 15 cannot advance bodily with the ram. The sprocket wheels 17 and 18 will, therefore, be rotated and the chain advanced or caused to travel around said sprockets. During this movement the lower lead 15ª of the chain is carried downward (by the downward movement of the sprockets 18 and 61) but is held against forward movement so that the bare parison is lowered into the open finishing mold 13. At the same time the next succeeding neck mold 14 is carried around the sprocket 18 and brought to the charge receiving position where it registers with the blank mold which has also moved forward with the ram to the charging position.

A tension and take-up wheel 62 carried on an arm 63 journaled on the shaft of the sprocket wheel 17, is held against the chain by a spring 64. The parison mold is so arranged that its center line 65 while in the Fig. 1 position, is a short distance in advance of the center line 66 of the finishing mold. As the parison moves downward into the finishing mold it is also moved rearwardly a short distance so that said center lines coincide. Such rearward movement is due to the downward inclination imparted to that portion of the chain 15 which is introduced between the stationary sprocket 54 and the idler 61 while the latter advances from the Fig. 1 to the Fig. 3 position.

As the ram commences its return movement and the blank mold is lifted from the pool of glass, a knife 67 (Fig. 7) operates to shear the glass at the bottom of the mold. The knife is operated by an air motor 68 supported from the ram 19 by means of a depending bracket arm 69. The motor piston is connected through a link 70 to the upper arm 71 of a lever pivoted at 72 to the bracket 69, the lower arm 73 of said lever being pivoted at 74 to the knife plate 75. A lever 76 pivoted at 77 to the plate 75 is connected through a link 78 to the lever arm 73. The upper end of the lever 76 engages a cam groove 79 formed in a cam plate on the bracket 69. The cam 79 is so shaped that the knife 67 is held substantially parallel with the bottom of the mold during the cutting stroke and also when the knife is in its retracted position, as shown in broken lines.

Figure 10:
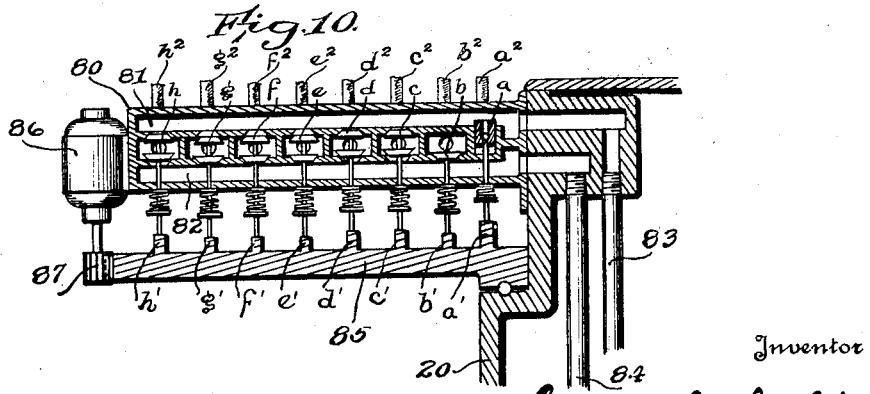
Fig. 10 is a sectional view showing the valves and their operating cams for controlling the various air motors and also controlling the supply of air and vacuum for the molds.

Fig. 10 shows a series of valves $a$, $b$, $c$, $d$, $e$, $f$, $g$ and $h$ for controlling the operation of the various air motors and also for controlling the application of suction and air pressure for introducing glass into the blank mold and forming the parison therein. These valves are mounted in a stationary valve box 80 on the upper end of the center column 20, said box comprising a vacuum chamber 81 and an air pressure chamber 82. A pipe 83 connected to a source of vacuum (not shown) and a pipe 84 connected to a source of air pressure (not shown), communicate respectively with the vacuum and air pressure chambers 81 and 82. A cam disk 85 mounted on the center column 20 is rotated continuously by an electric motor 86 carried on the valve box 80. The driving connection between the motor and cam disk 85 comprises a pinion 87 on the motor shaft running in mesh with gear teeth formed on the periphery of the disk. The valves $a$ to $h$ are actuated by ring cams $a'$, $b'$, $c'$, $d'$, $e'$, $f'$, $g'$ and $h'$ formed on the cam disk. The positions of the several valves, as shown in Fig. 10, are those assumed while the blank mold is in dip and gathering its charge as shown in Fig. 3.

Referring to Fig. 7, the usual plunger tip 88 for forming the initial blow opening in the parison is carried by a hollow plunger or cylinder 89 connected to the piston 90 of an air motor 91. When the plunger is in its lowered position and the blank mold in dip for gathering a charge, the valve $a$ is opened by its cam $a'$ to connect a pipe $a^2$ with the vacuum chamber 81. The pipe $a^2$ leads from the valve to the lower end of the cylinder 91 (Fig. 7). Openings 92 in the upper end of the hollow plunger 89 communicate with the interior of the motor cylinder 91 beneath the piston 90. The lower end of the hollow plunger 89 seats on the rim of an opening 93 formed in the plate 50. The lower end of the plunger 89 has openings 94 therein, through which the air is exhausted from the blank and neck mold cavities.

Air pressure and vacuum for actuating the knife operating motor 68 are controlled by the valve $d$. When the valve is in its lifted position as shown in Fig. 10, it establishes communication between the air pressure chamber 82 and the pipe $d^2$ leading from the valve to the motor 68 (Fig. 7). When air pressure is thus supplied to the motor, the knife is withdrawn to the dotted line position (Fig. 7). After the mold has received its charge, the knife operates as heretofore explained, such operation taking place when the valve $d$ is lowered so as to cut off the air pressure from the pipe $d^2$ and connect the latter with the vacuum chamber.

After the knife has operated and while held in mold closing position (Fig. 7), an initial puff of air is supplied to the mold for completing the formation of the parison therein. This air pressure is under the control of the valve $b$ which, when lifted, opens the air pressure chamber 82 to a branch pipe $b^2$ leading from the valve to the pipe $a^2$ (Fig. 7) so that the air under pressure is conducted through the pipes $b^2$, $a^2$ and cylinders 91 and 89 to the parison mold.

After this initial blowing operation, the motor 91 operates to lift the plunger. The operation of the motor 91 is controlled by the valve $c$. When the valve $c$ is lifted, it opens the air pressure chamber 82 to a pipe $c^2$ leading from the valve to the upper end of the motor cylinder so that the piston 90 is moved downward to lower the plunger tip 88. When the valve $c$ is lowered, it opens the vacuum chamber 81 to the pipe $c^2$ so that the air is exhausted from the motor cylinder 91 and the plunger lifted.

The valve $e$ controls the supply of air pressure and vacuum to the motor 51 which operates the neck mold as heretofore described. An air and vacuum line $e^2$ extends from the valve $e$ to the motor 51.

The valve $f$ is connected through a line $f^2$ to the ram operating motor 42 and controls the operation of said motor.

The valve $g$ is connected through a pipe $g^2$ to the motor 47 (Fig. 6) which opens and closes the blank mold.

The valve $h$ is connected through a pipe $h^2$ to the motor 24 for indexing the mold carriage.

Blow heads 95 (Figs. 1 and 3) for blowing the parisons in the finishing molds, are carried on a frame 96 which is mounted for up and down movement on a guide post 97. A cam roll 98 (Fig. 4) on the frame 96 runs in a cam track 99 formed in the outer face of the ring 32. The cam track comprises cam sections 100 arranged at intervals corresponding to the spacing of the finishing molds for lifting the frame 96 and blow heads to an inoperative position. The blow heads may be of usual construction comprising valves which are automatically opened by the lowering and seating of said heads on the molds, to connect said heads with an air pressure line (not shown).

A résumé of the operation is as follows:

The cam disk 85 is rotated continuously by the motor 86 for actuating the valves $a$ and $b$ (Fig. 10) for controlling the application of vacuum and air pressure respectively to the blank mold, and the valves $c, d, e, f, g, h$, which control the operation of the various air motors in a predetermined sequence. With the parts in the position shown in Fig. 3, the finishing mold carriage 12 is at rest, the ram 19 in its projected position and the blank mold 16 in its dip. The valve $a$ (Fig. 10) is opened so that suction is applied through the pipe $a^2$ (Figs. 10 and 7) for gathering the charge of glass. While the blank mold is gathering its charge, the next preceding parison is supported within the finishing mold 13 and neck mold 14, both of which are at this time closed and in register. The air motor 51 now operates under the control of the valve $e$ to open the neck mold 14. The motor 42 then operates under the control of the valve $f$ to retract the ram 19. When the ram commences its inward or retractive movement, the blank mold moves upward and outward. As soon as it is above the level of the glass in the tank, the valve $d$ operates the motor 68 (Fig. 7) to sever the glass. The valve $a^2$ now moves down to shut off the vacuum and the valve $b$ is momentarily lifted to supply a puff of air under pressure through the pipe lines $a^2$, $b^2$ to compact the glass in the mold.

During the retractive movement of the ram 19, the blank mold 16 carried thereby is moved upward and inward to a position over one of the finishing molds, as shown in Fig. 1. The blank mold remains closed and in locking engagement with the neck mold during this retractive movement, so that the neck mold carrier 15 is retracted with the ram but has no traveling movement about its sprockets. After the ram has completed its retractive movement, the valve $g$ is lifted to supply air pressure through the pipe $g^2$ to the motor 47 which now operates to open the blank mold, leaving the bare parison suspended from the neck mold. The valve $f$ is then lowered to open the pipe $f^2$ to vacuum and cause the ram 19 to be again projected for the next succeeding gather. During this forward movement of the ram, the pawl and ratchet (Figs. 1 and 8) lock the sprocket 54 so that the lower lead $15^a$ of the neck mold carrier cannot advance with the ram, it being noted that said sprocket 54 is mounted on the stationary frame. The carrier 15 will, therefore, be drawn around the sprockets 17 and 18 as the ram advances. During this advance, the neck mold with the bare parison depending therefrom is moved downward into the finishing mold directly therebeneath, while the blank mold is carried forward and downward to the gathering position and while the next succeeding neck mold 14 is also being carried to gathering position. At the completion of the forward movement of the ram, the valve $g$ is lowered to exhaust the air through the pipe $g^2$ and thereby cause the motor 47 to close the blank mold around the neck mold ready for the next gather.

When the motor 51 has operated to open the neck mold 14 which is over the finishing mold 13 and thereby complete the transfer of the parison to the finishing mold, the table 12 is given a step rotation by the indexing mechanism (Fig. 9). This indexing mechanism is under the control of the valve $h$ which, when lowered, opens the pipe $h^2$ to the vacuum and exhausts the air from the motor 24 so that the indexing arm 27 is advanced and through the pin 28 rotates the mold carriage through an angle of 60° (assuming the finishing molds to be spaced 60° apart on the finishing mold table). At the completion of this movement, the locking pin 28 is withdrawn by its cam 31 and the locking pin 33 is projected to engage the cam ring 32. The valve $h$ is now lifted to connect the pipe $h^2$ with air pressure and reverse the operation of the motor 24 so that the arm 27 is returned and the cam ring 32 rotated. Before such rotation commences, the blow heads 95 are held in their lifted position by one of the cam sections 100 which at this time is in engagement with the cam roll 98 (Fig. 4). As soon as the cam ring commences its rotation, the blow head frame 96 is lowered to seat the blow heads on two adjacent finishing molds and supply air pressure thereto. As the indexing arm is completing its return movement, the cam roll 98 again engages a cam section 101 and lifts the blow heads. The locking pin 33 is also withdrawn by its cam 34 to release the cam ring 32 and the pin 28 is projected to again lock the indexing arm with the mold carriage. Each finishing mold 13 is opened at a convenient point before it reaches the transfer position to discharge the finished bottle or other article which has been blown therein.

Modifications may be resorted to within the spirit and scope of my invention.

What I claim is:

1. In a machine for forming glass articles, the combination of a mold carriage, an annular series of molds thereon, means for rotating the carriage about a vertical axis, a mold carrier, a series of molds thereon, and means for moving said second mentioned series of molds in a vertical plane and bringing the molds of said second series successively to charging and blank transferring positions and into register with succeeding molds of the first mentioned series, said charging and blank transferring positions being in the same horizontal plane.

2. In a machine for forming hollow glass articles, the combination of a mold carriage, an annular series of finishing molds thereon, means for rotating the carriage about a vertical axis, a series of neck molds, an endless carrier on which the neck molds are mounted, and means for moving said carrier in a vertical plane and thereby bringing the neck molds in succession to charging and blank transferring positions and into cooperative relation to the finishing molds, said charging and blank transferring positions being in the same horizontal plane.

3. In a machine for forming glass articles, the combination of a series of finishing molds, means for moving said molds in a horizontal closed path, a series of neck molds, means for moving the neck molds in a vertical closed path and causing them to register in succession with the finishing molds, a body blank mold cooperating with the neck molds for forming parisons, means for moving the body blank mold in the vertical plane of said closed path between mold charging and parison transferring positions, and means for closing the finishing molds around the parisons at the transferring position.

4. In a machine for forming glass articles, the combination of a mold carriage, a series of finishing molds thereon, a series of neck molds, a blank mold, means for causing the blank mold to register with the neck molds in succession, means for introducing charges of glass into the combined blank and neck molds and forming parisons therein, means whereby the blank mold is caused to reciprocate and move with the neck molds between charging and parison transferring positions, and means for transferring the parisons to the finishing molds.

5. In a machine for forming glass articles, the combination of a mold carriage, a series of finishing molds thereon, a series of neck molds, a blank mold, means for causing the blank mold to register with the neck molds in succession and travel therewith between charge gathering and parison transferring positions, means for gathering charges of glass by suction into the combined blank and neck molds and forming parisons therein, and means for transferring each parison while supported in its neck mold, from the gathering position to the finishing mold.

6. In a machine for forming glass articles, the combination of a blank mold having a receiving opening facing downwardly at all times, a series of neck molds, means for causing the blank mold to register with the neck molds in succession, suction means for introducing charges of glass into the registered molds and forming parisons therein, finishing molds, means to bring them in succession to a parison receiving position, and means for transferring the parisons to the finishing molds.

7. In a machine for forming glass articles, the combination of a ram, means for reciprocating said ram in the direction of its length, a mold carrier on said ram, molds on said carrier, means for actuating said carrier and thereby bringing the molds thereon in succession to a receiving position, and means for introducing molten glass into the molds while at said receiving position.

8. In a machine for forming glass articles, the combination of a ram, means for reciprocating the ram in the direction of its length, an endless carrier supported on the ram, a series of molds on said carrier, and means for engaging said carrier at one point and holding it against movement with the ram in one direction and thereby advancing said carrier and the molds thereon step-by-step as the ram reciprocates.

9. The combination of a container for molten glass, a ram, a gathering mold carried thereby, means for reciprocating the ram and thereby bringing the mold periodically to a charge gathering position, a series of molds supported on the ram, and means operating in synchronism with the reciprocations of the ram to bring the molds in succession into a position in register with the gathering mold.

10. The combination of a container for molten glass, a ram, a gathering mold carried thereby, means for reciprocating the ram and thereby bringing the mold periodically to a charge gathering position, a series of molds supported on the ram, means operating in synchronism with the reciprocations of the ram to bring the molds in succession into a position in register with the gathering mold, means cooperating with said molds for forming parisons therein, a finishing mold carriage, finishing molds thereon, and means for transferring the parisons from the gathering mold to the finishing molds.

11. In a machine for forming glass articles, the combination of a reciprocating frame, an endless carrier mounted thereon, a series of molds on said carrier, means for reciprocating said frame, and means for advancing said carrier relative to the frame during the movement of the carrier in one direction and permitting the carrier to retain a fixed position relative to the frame during the return movement of the latter, whereby the molds are advanced step-by-step.

12. The combination of an endless chain carrier, molds carried thereby, a reciprocating frame, sprocket wheels on said frame over which the carrier is trained, a sprocket wheel mounted independently of said frame and running in mesh with the carrier, and means for locking said last mentioned wheel against rotation in one direction and thereby causing it to advance said carrier and molds step-by-step as said frame reciprocates.

13. The combination of an endless chain carrier, neck molds carried thereby, a reciprocating frame, sprocket wheels on said frame over which the carrier is trained, a sprocket wheel mounted independently of said frame and running in mesh with the carrier, means for locking said last mentioned wheel against rotation in one direction and thereby causing it to advance said carrier and neck molds step-by-step as said frame reciprocates, a charge receiving mold carried on said frame and brought into register with the neck molds in succession, and means for introducing charges of glass into the molds.

14. The combination of an endless chain carrier, neck molds carried thereby, a reciprocating frame, sprocket wheels on said frame over which the carrier is trained, a sprocket wheel mounted independently of said frame and running in mesh with the carrier, means for locking said last mentioned wheel against rotation in one direction and thereby causing it to advance said carrier and neck molds step-by-step as said frame reciprocates, a charge receiving mold carried on said frame and brought into register with the neck molds in succession, means cooperating with the registered molds for forming parisons therein, a series of finishing molds, and means for transferring the parisons to the finishing molds.

15. In a machine for forming glass articles, the combination of a mold carriage, an annular series of finishing molds thereon, means for rotating the carriage about a vertical axis, a mold carrier mounted for reciprocation along an inclined path in a plane above said mold carriage, a series of neck molds on said carrier, a single blank mold on the carrier, means for reciprocating said carrier and causing the blank mold to register with the neck molds in succession at a charging position, means whereby movement of the carrier in one direction places the blank mold and neck mold in register with a finishing mold and movement in the reverse direction brings the blank mold into register with another neck mold at a gathering position, and means for transferring blanks to the finishing molds.

Signed at Toledo, Ohio, this 23d day of August, 1930.

LEONARD D. SOUBIER.